US011706662B2

(12) United States Patent
Nguyen et al.

(10) Patent No.: US 11,706,662 B2
(45) Date of Patent: Jul. 18, 2023

(54) TECHNIQUES FOR DETERMINING A NUMBER OF (RE)TRANSMISSIONS IN WIRELESS COMMUNICATIONS

(71) Applicant: QUALCOMM Incorporated, San Diego, CA (US)

(72) Inventors: Tien Viet Nguyen, Bridgewater, NJ (US); Sudhir Kumar Baghel, Hillsborough, NJ (US); Arjun Bharadwaj, Cupertino, CA (US); Kapil Gulati, Hillsborough, NJ (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 16/738,866

(22) Filed: Jan. 9, 2020

(65) Prior Publication Data

US 2020/0229030 A1 Jul. 16, 2020

Related U.S. Application Data

(60) Provisional application No. 62/791,363, filed on Jan. 11, 2019.

(51) Int. Cl.
*H04W 28/04* (2009.01)
*H04L 1/1867* (2023.01)
*H04W 24/08* (2009.01)
*H04W 28/02* (2009.01)

(52) U.S. Cl.
CPC .............. *H04W 28/04* (2013.01); *H04L 1/189* (2013.01); *H04W 24/08* (2013.01); *H04W 28/0268* (2013.01); *H04W 28/0284* (2013.01)

(58) Field of Classification Search
CPC ......... H04W 28/0284; H04W 28/0268; H04W 28/0273; H04W 28/0205; H04W 28/04; H04W 24/08; H04L 1/1887; H04L 1/1893; H04L 1/1825; H04L 1/189; H04L 1/1877; H04L 1/1685
See application file for complete search history.

(56) References Cited

U.S. PATENT DOCUMENTS

2008/0253327 A1* 10/2008 Kohvakka ............. H04W 16/14
370/330
2008/0313520 A1* 12/2008 Suneya ................. H04L 1/0086
714/748

(Continued)

FOREIGN PATENT DOCUMENTS

WO 2018084608 A2 5/2018

OTHER PUBLICATIONS

International Search Report and Written Opinion—PCT/US2020/013172—ISA/EPO—dated Apr. 9, 2020.

*Primary Examiner* — Kevin C. Harper
(74) *Attorney, Agent, or Firm* — Arent Fox LLP and Qualcomm Incorporated

(57) ABSTRACT

Aspects described herein relate to determining a congestion level related to communicating with one or more devices in a wireless network, determining, based on the congestion level, a retransmission scheme for transmitting and/or retransmitting communications in the wireless network, and transmitting or retransmitting a communication in the wireless network based on the retransmission scheme.

26 Claims, 4 Drawing Sheets

(56) References Cited

U.S. PATENT DOCUMENTS

| | | | |
|---|---|---|---|
| 2015/0036573 A1* | 2/2015 | Malik | G08C 17/02 |
| | | | 370/311 |
| 2015/0098352 A1* | 4/2015 | Froehlich | H04W 24/08 |
| | | | 370/252 |
| 2015/0131542 A1* | 5/2015 | Amini | H04B 1/0057 |
| | | | 370/329 |
| 2017/0164396 A1* | 6/2017 | Matsumoto | H04W 72/02 |
| 2017/0230959 A1* | 8/2017 | Wu | H04L 5/0044 |
| 2017/0303159 A1* | 10/2017 | Ma | H04W 28/0289 |
| 2018/0092135 A1* | 3/2018 | Dash | H04W 4/90 |
| 2018/0123767 A1* | 5/2018 | Islam | H04L 1/1816 |
| 2018/0234881 A1 | 8/2018 | Hosseini et al. | |
| 2020/0084592 A1* | 3/2020 | Gulati | H04W 76/11 |

\* cited by examiner

TECHNIQUES FOR DETERMINING A NUMBER OF (RE)TRANSMISSIONS IN WIRELESS COMMUNICATIONS

CLAIM OF PRIORITY UNDER 35 U.S.C. § 119

The present Application for Patent claims priority to Provisional Application No. 62/791,363, entitled "TECHNIQUES FOR DETERMINING A NUMBER OF (RE) TRANSMISSIONS IN WIRELESS COMMUNICATIONS" filed Jan. 11, 2019, which is assigned to the assignee hereof and hereby expressly incorporated by reference herein for all purposes.

BACKGROUND

Aspects of the present disclosure relate generally to wireless communication systems, and more particularly, to determining a number of retransmissions for wireless communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

Some wireless communication networks include vehicle-based communication devices that can communicate from vehicle-to-vehicle (V2V), vehicle-to-infrastructure (V2I) (e.g., from the vehicle-based communication device to road infrastructure nodes), vehicle-to-network (V2N) (e.g., from the vehicle-based communication device to one or more network nodes, such as a base station), a combination thereof and/or with other devices, which can be collectively referred to as vehicle-to-anything (V2X) communications. In NR V2X, communication reliability can be improved by using multiple transmissions (often referred to as an initial transmission and one or more retransmissions) at the transmitter, and by recombining one or more of the multiple transmissions at the receiver.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for wireless communication is provided. The method includes determining a congestion level related to communicating with one or more devices in a wireless network, determining, based on the congestion level, a retransmission scheme for transmitting and/or retransmitting communications in the wireless network, and transmitting or retransmitting a communication in the wireless network based on the retransmission scheme.

In another example, an apparatus for wireless communication is provided. The apparatus includes a transceiver, a memory configured to store instructions, and one or more processors communicatively coupled with the transceiver and the memory. The one or more processors are configured to determine a congestion level related to communicating with one or more devices in a wireless network, determine, based on the congestion level, a retransmission scheme for transmitting and/or retransmitting communications in the wireless network, and transmit or retransmit a communication in the wireless network based on the retransmission scheme.

In another example, an apparatus for wireless communication is provided. The apparatus includes means for determining a congestion level related to communicating with one or more devices in a wireless network, means for determining, based on the congestion level, a retransmission scheme for transmitting and/or retransmitting communications in the wireless network, and means for transmitting or retransmitting a communication in the wireless network based on the retransmission scheme.

In another example, a computer-readable medium, including code executable by one or more processors for wireless communication is provided. The code includes code for determining a congestion level related to communicating with one or more devices in a wireless network, determining, based on the congestion level, a retransmission scheme for transmitting and/or retransmitting communications in the wireless network, and transmitting or retransmitting a communication in the wireless network based on the retransmission scheme.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
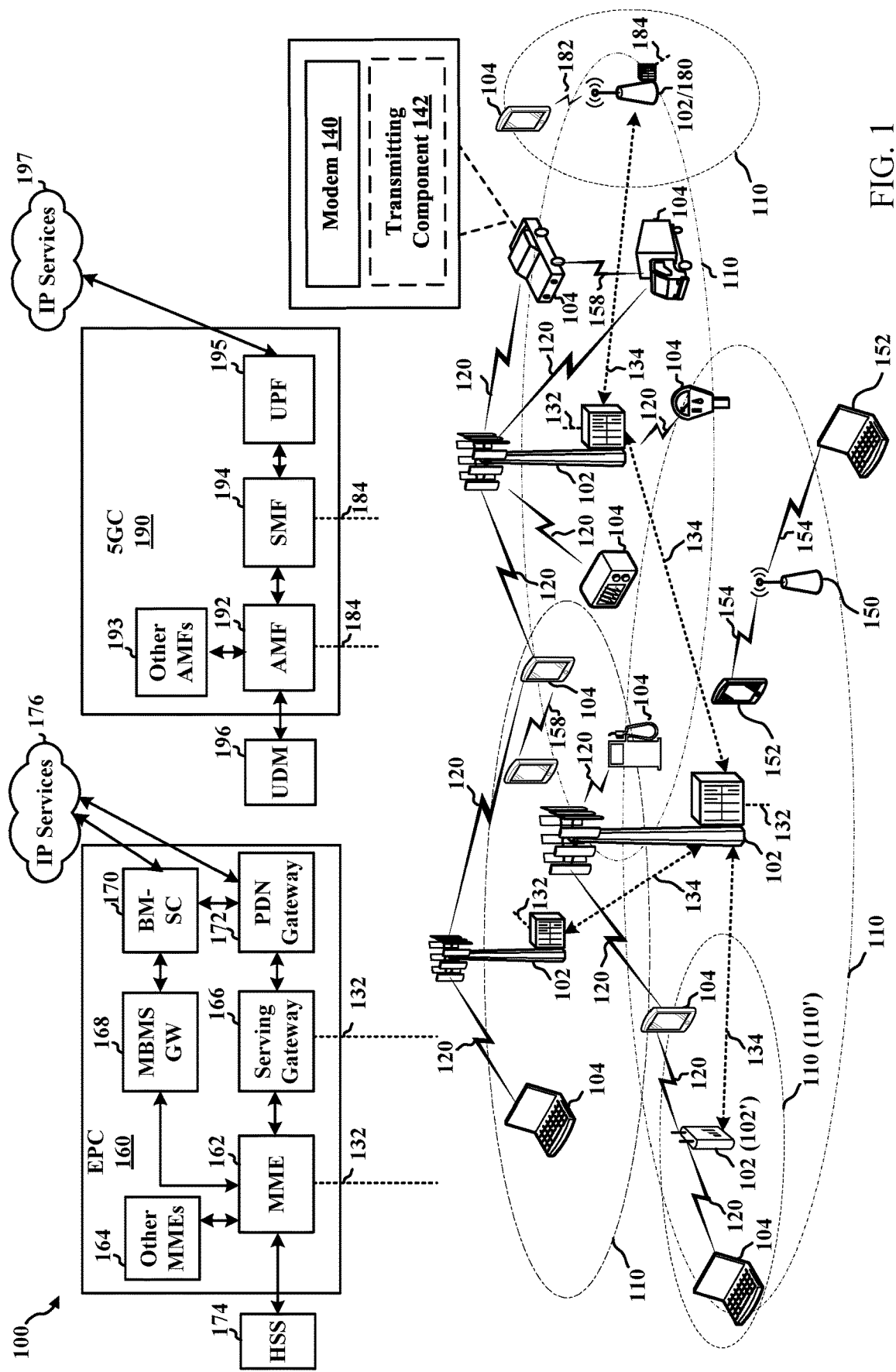
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to determining a number of (re)transmissions for a packet (or more generally, any communication) in wireless communications. Using retransmissions at a transmitter and combining the initial transmitted communications and one or more retransmitted communications (collectively referred to herein as "(re) transmissions") can improve communication reliability. The retransmissions can be transmitted based on received feedback from the receiver or blindly (e.g., without, or regardless of, receiving feedback). Benefits of retransmission can include: allowing decoding of a packet, for a receiver that is affected by half duplex, or for which control is lost on some transmissions, based on the remaining one or more retransmissions; reserving resources for retransmissions by previous transmissions so reception(s) of subsequent transmissions is(are) less prone to interference; and/or improving link budget for far away devices by combining at the receiver. Retransmissions, however, can come with a cost of increasing network load and general interference conditions. These costs, however, can be balanced by adjusting a number of (re)transmissions of a communication based on the congestion level.

In one example, for a higher congestion level, a lower number of (re)transmissions can be used, and for lower congestion level, a higher number of (re)transmissions can be used. In addition, in an example, different priority levels and/or quality-of-service (QoS) class can have different congestion levels, and can accordingly result in configuring a different number of (re)transmissions. In a specific example, a transmitting device can analyze one or more of various metrics to determine a congestion level for the communications, and can map the congestion level to (or otherwise determine based on the congestion level) a number of (re)transmissions, such to determine how many transmissions (including an initial transmission and/or one or more retransmissions) to use in transmitting a communication in a wireless network. For a given congestion level, the transmitting device can determine a number of feedback-based retransmissions and/or a number of blind retransmissions. For example, the transmitting device can transmit feedback-based retransmissions based on receiving negative acknowledge (NACK) feedback from a receiving device (also referred to herein as a "receiver"), and the number of feedback-based retransmissions can refer to the number of feedback-based retransmission operations allowed before the communication is dropped. In this example, the transmitting device can also stop retransmitting the communication where positive feedback is received from the receiving device. Blind retransmissions can refer to transmissions that occur regardless of any feedback that may or may not be received.

The concepts are generally described herein with respect to device-to-device (D2D) communication technologies. For example, D2D communication technologies can include vehicle-to-vehicle (V2V) communications, vehicle-to-infrastructure (V2I) communications (e.g., from a vehicle-based communication device to road infrastructure nodes), vehicle-to-network (V2N) communications (e.g., from a vehicle-based communication device to one or more network nodes, such as a base station), a combination thereof and/or with other devices, which can be collectively referred to as vehicle-to-anything (V2X) communications. In V2X communications, vehicle-based communication devices (e.g., vehicle-based user equipment (UE)) can communicate with one another and/or with infrastructure devices over a sidelink channel. Continued support and implementation of V2X communications is provided in fifth generation (5G) new radio (NR) communication technologies, as well as long term evolution (LTE). Though aspects are generally described herein in terms of D2D/V2X communications, the concepts and techniques can be similarly applied more generally to substantially any type of wireless communications, including device to network (e.g., UE to base station) communications.

The described features will be presented in more detail below with reference to FIGS. 1-4.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, referring to the D2D communications described above, where the devices are vehicles or otherwise vehicle-based, the D2D communications between the devices (e.g., over a sidelink channel of communication link 158) can be referred to as V2V communications, which are defined for 3GPP LTE and are being defined for 5G NR. When the vehicles or vehicle-based devices communicate with other infrastructure nodes for the vehicle-based communications (e.g., over the sidelink), this can be referred to as V2I communications. When the vehicles or vehicle-based devices communicate with a base station 102 or other network node (e.g., over a communication link 120), this can be referred to as V2N communications. The collection of V2V, V2I, V2N, and/or vehicle-to-anything else can be referred to as V2X communications. In an example, LTE can support V2X communications (referred to as "LTE-V2X") for safety messages communicated between vehicles and/or from vehicles to infrastructure. 5G NR can also support V2X (referred to as "NR-V2X") for communications related to autonomous driving. For example, sidelink V2X communications may occur in a dedicated portion of spectrum such as the 5.9 GHz dedicated short range communications (DSRC) bandwidth reserved for vehicle-based communications.

In aspects described herein, UE 104, which can be a vehicle-based UE or otherwise, can include a modem 140 for communicating with other UEs and/or base stations in a wireless network. UE 104 can also include one or more of a transmitting component 142 for transmitting V2X (or more generally D2D) communications to one or more other UEs 104, infrastructure nodes, etc., as described further herein. In a specific example, UE 104 can transmit and retransmit the V2X communications based on a retransmission scheme determined for a detected congestion level for the wireless network. For example, transmitting component 142 can determine a congestion level and can accordingly select a retransmission scheme that indicates a number of blind or feedback-based retransmissions for communications based on the determined congestion level. The transmitting component 142 can accordingly transmit/retransmit the communications based on the retransmission scheme. The UE receiving the transmissions and retransmissions can combine the transmissions and retransmissions (e.g., using hybrid automatic repeat/request (HARD) combining), which can improve the quality and/or reliability thereof.

Figure 2:
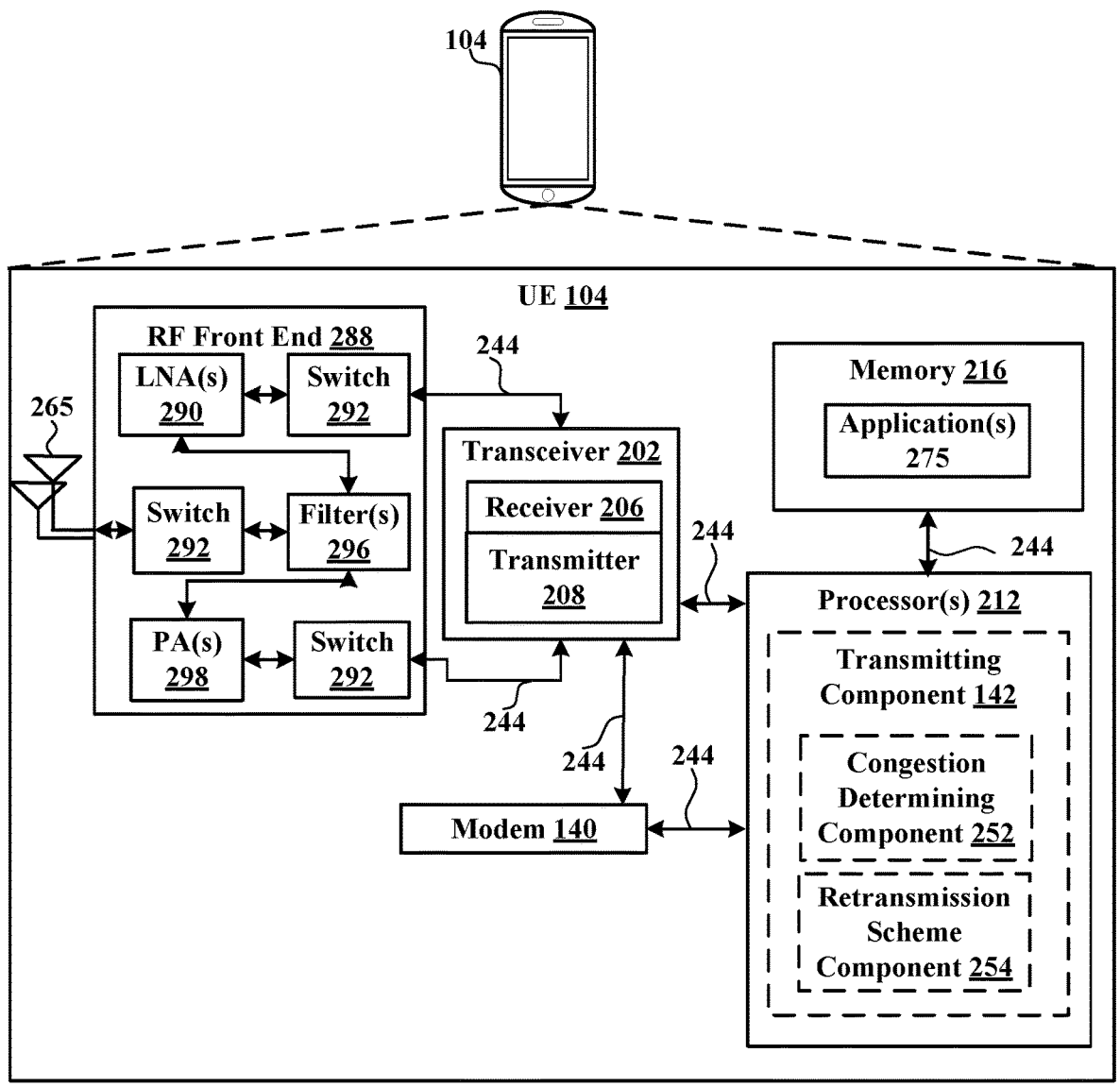
FIG. 2 is a block diagram illustrating an example of a UE, in accordance with various aspects of the present disclosure.
Figure 3:
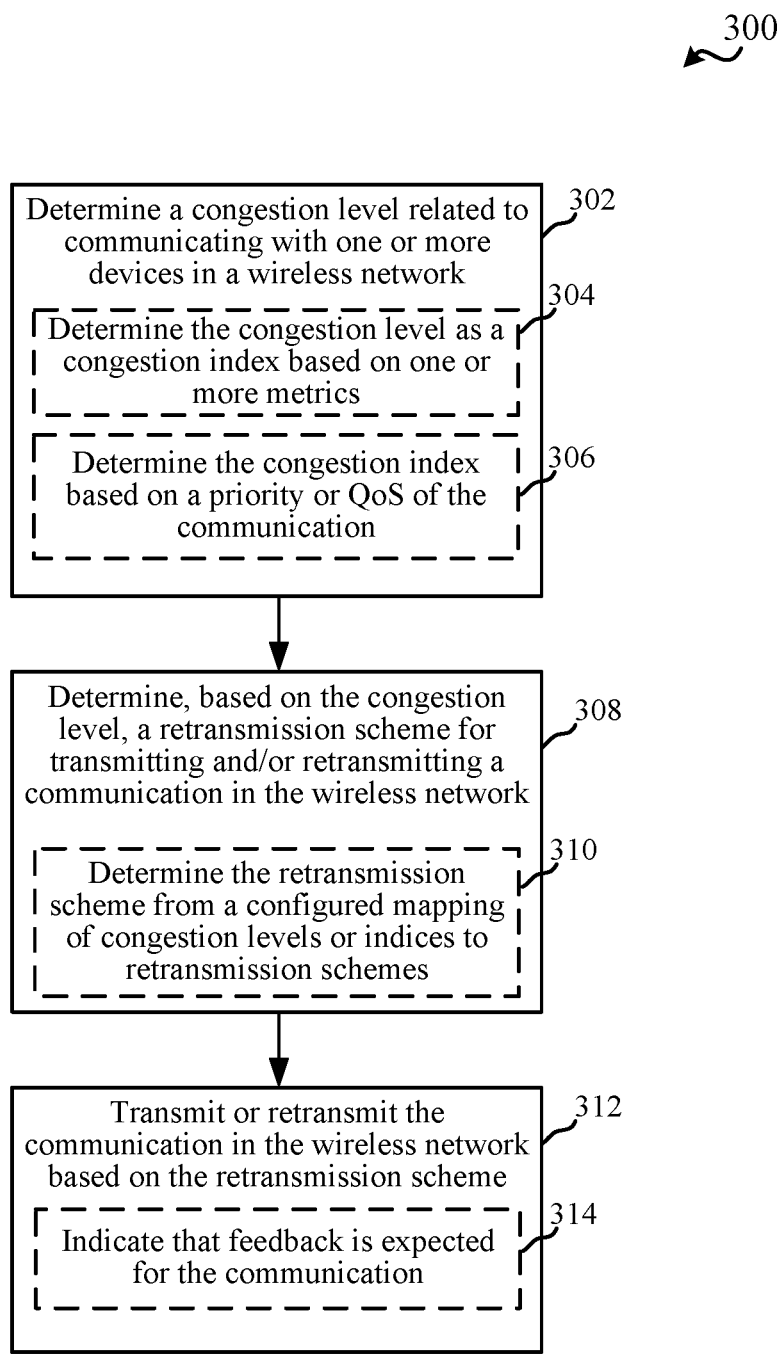
FIG. 3 is a flow chart illustrating an example of a method for determining a retransmission scheme based on congestion level in accordance with various aspects of the present disclosure.
Figure 4:
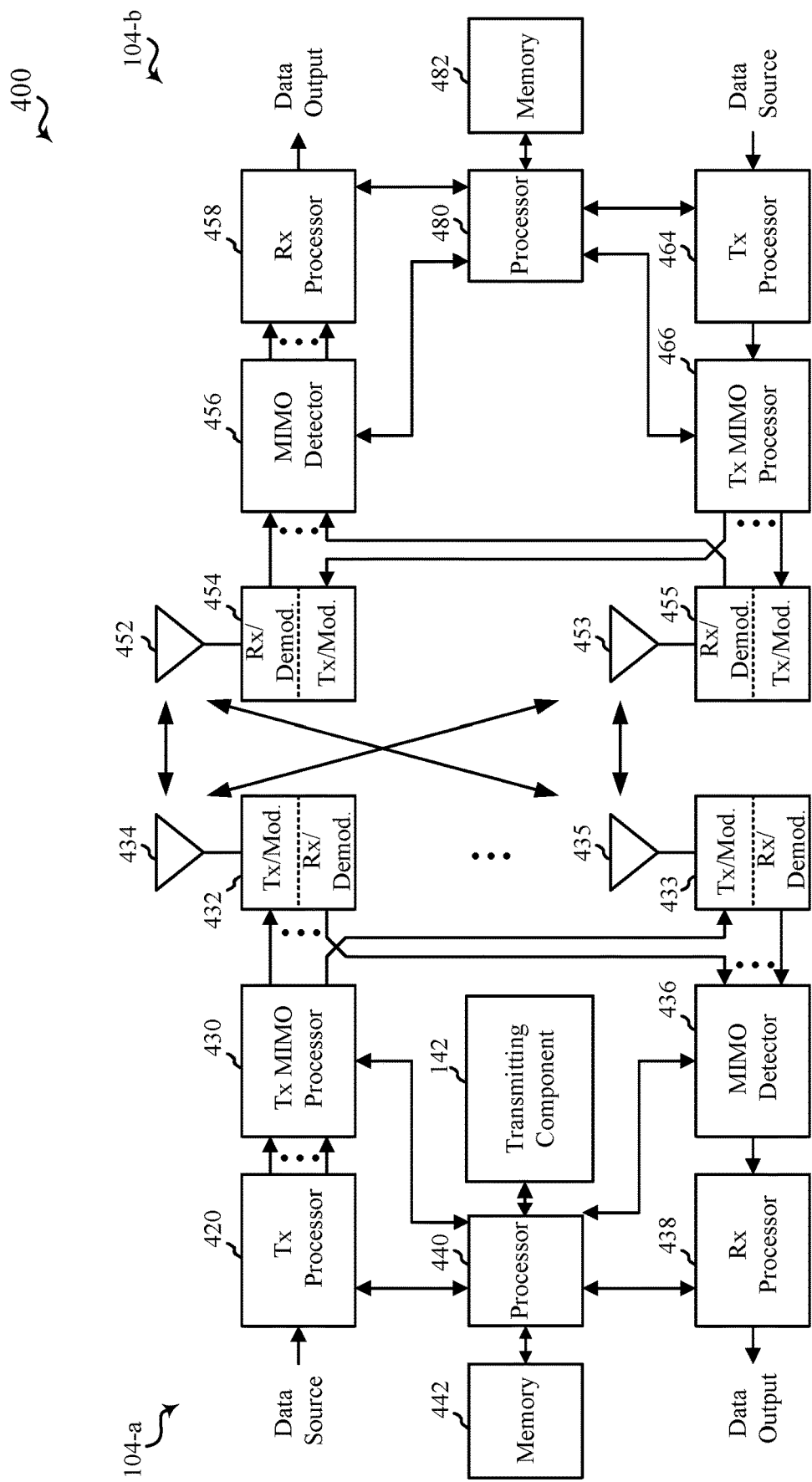
FIG. 4 is a block diagram illustrating an example of a MIMO communication system including a base station and a UE, in accordance with various aspects of the present disclosure.

Turning now to FIGS. 2-4, aspects are depicted with reference to one or more components and one or more methods that may perform the actions or operations described herein, where aspects in dashed line may be optional. Although the operations described below in FIG. 3 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in a communication via one or more buses 244, which may operate in conjunction with modem 140, a transmitting component 142 for transmitting/retransmitting communications in a wireless network, according to one or more of the functions described herein.

In an aspect, the one or more processors 212 can include a modem 140 and/or can be part of the modem 140 that uses one or more modem processors. Thus, the various functions related to transmitting component 142 may be included in modem 140 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 140 associated with transmitting component 142 may be performed by transceiver 202.

Also, memory 216 may be configured to store data used herein and/or local versions of applications 275 or transmitting component 142 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining transmitting component 142 and/or one or more of its subcomponents, and/or data associated therewith, when UE 104 is operating at least one processor 212 to execute transmitting component 142 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 140 can configure transceiver 202 to operate at a specified frequency and power level based on the UE configuration of the UE 104 and the communication protocol used by modem 140.

In an aspect, modem 140 can be a multiband-multimode modem, which can process digital data and communicate with transceiver 202 such that the digital data is sent and received using transceiver 202. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, transmitting component 142 can optionally include a congestion determining component 252 for determining a congestion level or other congestion metric for a wireless network, and/or a retransmission scheme component 254 for selecting or defining a retransmission scheme for transmitting and/or retransmitting a communication in the wireless network based on the congestion.

In an aspect, the processor(s) 212 may correspond to one or more of the processors described in connection with the UE in FIG. 4. Similarly, the memory 216 may correspond to the memory described in connection with the UE in FIG. 4.

FIG. 3 illustrates a flow chart of an example of a method 300 for transmitting and/or retransmitting communications in a wireless network according to a retransmission scheme. In an example, a UE 104 can perform the functions described in method 300 using one or more of the components described in FIGS. 1-2, such as transmitting component 142 and/or its subcomponents.

In method 300, at Block 302, a congestion level related to communicating with one or more devices in a wireless network can be determined. In an aspect, congestion determining component 252, e.g., in conjunction with processor(s) 212, memory 216, transceiver 202, transmitting component 142, etc., can determine the congestion level related to communicating with the one or more devices in the wireless network. For example, congestion determining component 252 can determine the congestion level based on measuring one or more metrics associated with the wireless network, communications in the wireless networks, etc. In an example, possible congestion levels may include an index corresponding to the congestion level, a bit indicator to indicate low or high congestion, etc., as described herein. In addition, for example, congestion determining component 252 can determine the congestion level based on comparing the one or more metrics to one or more thresholds, where each of the one or more thresholds can correspond to a possible congestion level.

For example, congestion determining component 252 can determine the congestion level based at least in part on a channel busy ratio (CBR), which may include detecting a number of probes on a set of radio resources for a channel. In an example, congestion determining component 252 can determine to measure CBR on the channel where the channel is determined to have an energy level that achieves a threshold. For example, congestion determining component 252 can measure the energy level as, or based on, one or more of a received signal strength indicator (RSSI), reference signal received power (RSRP), reference signal received quality (RSRQ), signal-to-noise ratio (SNR), etc. The CBR may be represented as a percentage of the channel being utilized based on the detected probes. In another example, congestion determining component 252 can receive an indication of the CBR from one or more other nodes (e.g., one or more other UEs 104, a base station 102, etc.). In any case, for example, a higher CBR can result in determining a higher congestion level. For example, congestion determining component 252 can determine the congestion level based on determining whether the CBR (e.g., CBR percentage) achieves one or more thresholds, where each of the one or more thresholds can correspond to a congestion level.

In another example, congestion determining component 252 can determine the congestion level based at least in part on a number of resources reserved by other devices (e.g., UEs). For example, congestion determining component 252 may determine the number of resources reserved by other devices by, or based on, detecting signals defined in V2X communications that are received from the other devices, where the signals relate to reserving resources for subsequent transmissions by the other devices. In one example, the signals may include signals related to requesting, by the other devices, resources to use in transmitting V2X communications (e.g., one or more signals related to reserving the medium to transmit the V2X communications). In an example, a higher number of resources reserved by other devices can result in determining a higher congestion level.

In other examples, congestion determining component 252 can determine the congestion level based at least in part on the current communication to be transmitted. For example, congestion determining component 252 can determine the congestion level based at least in part on a number of available resources that fit the current communication to be transmitted by the UE 104 (e.g., a number of transmission time intervals (TTIs) and/or resource blocks (RBs) that fit a packet resource requirement for the communication). For example, congestion determining component 252 can determine the number of possible resource allocations from those available in the network that can be used for encoding and transmitting the communication. In an example, determining a higher number of resources that fit the communication can result in determining a lower level of congestion. In another example, congestion determining component 252 can determine the congestion level based at least in part on a ratio of packets in the same priority and/or QoS class as the current communication to be transmitted that either drop or cannot be transmitted with the required number of retransmissions due to lack of resources. In an example, a high measure of this metric can result in determining a higher level of congestion.

In other examples, congestion determining component 252 can determine the congestion level based at least in part on one or more of the aforementioned metrics. In other examples, the UE 104 may receive an indication of a congestion level from one or more other devices in the wireless network (e.g., one or more UEs 104, base stations 102 or other nodes, etc.).

In an example, in determining the congestion level at Block 302, optionally at Block 304, the congestion level can be determined as a congestion index based on one or more metrics. In an aspect, congestion determining component 252, e.g., in conjunction with processor(s) 212, memory 216, transceiver 202, transmitting component 142, etc., can determine the congestion level and the congestion index based on the one or more metrics. Thus, for example, congestion determining component 252 can determine the congestion level as an integer representation of the congestion level. For example, congestion determining component 252 can select a congestion index based on an associated range of metric values for the measured one or more metrics (e.g., congestion index 1 based on CBR achieving a first threshold, congestion index 2 based on CBR achieving a second threshold greater than the first threshold, etc.). In other examples, the congestion index may be a bit to indicate low or high congestion, etc.

In addition, in an example, in determining the congestion level at Block 302, optionally at Block 306, the congestion index can be determined based on a priority or QoS class for the communication. In an aspect, congestion determining component 252, e.g., in conjunction with processor(s) 212, memory 216, transceiver 202, transmitting component 142, etc., can determine the congestion index based on the priority or the QoS class of the communication. For example, different priorities or QoS classes can be associated with different perceptions of congestion. In an example, different QoS classes can have different resource demands (e.g., where the resource demands may include a number of transmission RBs, number of aggregated TTIs per transmission, number of transmissions, etc.). In this regard, for example, for a QoS class that uses more resources, the network can be observed as more congested than for other QoS classes due to the added resource demands. Similarly, higher priority packets transmitted by devices can ignore resources reserved by lower priority classes, and thus for higher priority class packets, the network can be observed as less congested than for lower priority class packets. Thus, in an example, the congestion index can be separately defined for packet priorities and/or QoS classes for communications. Given a communication to be transmitted, in this example, congestion determining component 252 can select a mapping or function for the appropriate priority and/or QoS class, and can select the corresponding congestion index based on congestion metric values, as described above, where there thresholds for determining the congestion index can be different per priority and/or QoS class.

In one example, congestion determining component 252 can determine a definition of the congestion index based on a stored configuration or a configuration otherwise received by the network (e.g., from a base station 102, another UE 104, etc.). For example, the definition of the congestion index may indicate the congestion index and associated metric thresholds (e.g., for metrics that may include one or more of CBR, number of resources reserved by other UEs, number of resources that fit the current communication, ratio of packets that are dropped, etc., as described above). In addition, for example, the definition of the congestion index may include different definitions (e.g., different threshold ranges) for multiple packet priorities, QoS classes, etc., as described. In any case, congestion determining component 252 can determine the congestion level or index based on the one or more metrics, which may be associated with a specific packet priority and/or QoS class, and can determine an associated retransmission scheme, as described below.

In method 300, at Block 308, a retransmission scheme for transmitting and/or retransmitting a communication in the wireless network can be determined based on the congestion level. In an aspect, retransmission scheme component 254, e.g., in conjunction with processor(s) 212, memory 216, transceiver 202, transmitting component 142, etc., can determine, based on the congestion level, the retransmission scheme for transmitting and/or retransmitting the communication in the wireless network. For example, based on the level of congestion, the retransmission scheme component 254 can select or develop a retransmission scheme in an attempt to balance the benefits of retransmission with the cost of resource utilization, as described above. Generally, for example, for a higher determined congestion level, retransmission scheme component 254 can determine a lower number of retransmissions (as compared to a lower determined congestion level), and/or can determine the number of retransmissions based additionally on packet priority and/or QoS class.

In addition, for example, retransmission scheme component 254 can determine the retransmission scheme as having a number of feedback-based retransmissions and/or blind retransmissions, a pattern of feedback-based retransmissions and/or blind retransmissions, etc. For example, the pattern of feedback-based retransmissions and/or blind retransmissions may specify whether to use a blind retransmission or feedback-based retransmission in a sequence of retransmission opportunities (e.g., transmit one or more blind retransmissions, followed by one or more feedback-based retransmissions, followed by another one or more blind retransmissions, etc.). As described, feedback-based retransmissions can be retransmitted based on receiving negative feedback for a transmission/retransmission (e.g., negative-acknowledgement (NACK) HARQ feedback), whereas blind retransmissions can be transmitted regardless of whether feedback is received. For feedback-based retransmissions, the retransmission scheme can stop retransmitting when positive feedback (e.g., acknowledgement (ACK) HARQ feedback) is received for a transmission/retransmission.

In determining the retransmission scheme at Block 308, optionally at Block 310, the retransmission scheme can be determined from a configured mapping of congestion levels or indices to retransmission schemes. In an aspect, retransmission scheme component 254, e.g., in conjunction with processor(s) 212, memory 216, transceiver 202, transmitting component 142, etc., can determine the retransmission scheme from the configured mapping of congestion levels or indices to retransmission schemes. For example, the congestion indices can each be mapped to a retransmission scheme, such as congestion index 1: n1 transmissions and then m1 feedback-based transmissions, index 2: n2 transmissions and then m2 feedback-based transmissions, index 3: n3 transmissions and then m3 feedback-based transmissions, etc. where n1, n2, n3, m1, m2, m3 can be integers, and in one example, $n1<=n2<=n3$ and $m1<=m2<=m3$ where congestion index 1 indicates a lower level of congestion than index 2 which indicates a lower level of congestion than index 3, etc. In addition, as described, the mappings and resulting retransmission schemes can be different for different packet priorities and/or QoS classes. In any case, as described, congestion determining component 252 can determine the appropriate mapping for the packet priority and/or QoS class, and retransmission scheme component 254 can determine the appropriate retransmission scheme based on the computed congestion index or congestion level.

In one example, the mapping of congestion level, and/or associated congestion level index, to retransmission scheme can be indicated in a configuration at the UE 104, which may be received from the network (e.g., from a base station 102), stored by the UE 104 in a memory 216, etc. In a specific example, the configuration may indicate a first number of blind retransmissions and/or feedback-based retransmissions for high level of congestion and/or can indicate a second number of blind retransmissions and/or feedback-based retransmissions for a low level of congestion. In another example, retransmission scheme component 254 can determine the retransmission scheme as a function of the congestion level (e.g., and/or can determine each of the number of blind and/or feedback-based retransmissions based on the congestion level, the associated congestion level index, and/or the like).

In method 300, at Block 312, the communication can be transmitted or retransmitted in the wireless network based on the retransmission scheme. In an aspect, transmitting component 142, e.g., in conjunction with processor(s) 212, memory 216, transceiver 202, etc., can transmit or retransmit the communication in the wireless network based on the retransmission scheme. Thus, for example, transmitting component 142 can transmit and retransmit a number of blind transmissions, can transmit a number of feedback-based retransmissions (e.g., until ACK is received or until the number of retransmissions from the retransmission scheme has been reached), etc.

In an example, in transmitting or retransmitting the communication at Block 312, optionally at Block 314, it can be indicated that feedback is expected for the communication. In an aspect, transmitting component 142, e.g., in conjunction with processor(s) 212, memory 216, transceiver 202, etc., can indicate that feedback is expected for the communication. For example, this can be based on the determined retransmission scheme (e.g., whether the retransmission scheme includes feedback-based retransmissions). The receiving device can use the indication to determine whether to transmit feedback, as not transmitting feedback can further save radio resources. In an example, transmitting component 142 can explicitly indicate that feedback is expected in control data for the communication transmitted in a control channel (and/or other control resources for redundancy). In another example, transmitting component 142 can indicate a feedback distance in a control channel (and/or other control resources for redundancy). In this example, any receiving device who cannot receive the packet and is within this feedback distance should send a NACK feedback. In one example, transmitting component 142 may specify a feedback distance of 0 to indicate that no feedback is required. In any case, for feedback-based transmissions, where NACK feedback is received, transmitting component 142 can retransmit the communication based on the retransmission scheme. Where the number of retransmissions in the retransmission scheme is achieved, transmitting component 142 can drop or otherwise refrain from transmitting the communication.

FIG. 4 is a block diagram of a MIMO communication system 400 including UEs 104-a, 104-b. The MIMO communication system 400 may illustrate aspects of the wireless communication access network 100 described with reference to FIG. 1. The UE 104-a may be an example of aspects of the UE 104 described with reference to FIGS. 1-2. The UE 104-a may be equipped with antennas 434 and 435, and the UE 104-b may be equipped with antennas 452 and 453. In the MIMO communication system 400, the UEs 104-a, 104-b may be able to send data over multiple communication links at the same time. Each communication link may be called a "layer" and the "rank" of the communication link may indicate the number of layers used for communication. For example, in a 2×2 MIMO communication system where UE 104-a transmits two "layers," the rank of the communication link between the UE 104-a and the UE 104-b is two.

At the UE 104-a, a transmit (Tx) processor 420 may receive data from a data source. The transmit processor 420 may process the data. The transmit processor 420 may also generate control symbols or reference symbols. A transmit MIMO processor 430 may perform spatial processing (e.g., precoding) on data symbols, control symbols, or reference symbols, if applicable, and may provide output symbol streams to the transmit modulator/demodulators 432 and 433. Each modulator/demodulator 432 through 433 may process a respective output symbol stream (e.g., for OFDM, etc.) to obtain an output sample stream. Each modulator/demodulator 432 through 433 may further process (e.g., convert to analog, amplify, filter, and upconvert) the output sample stream to obtain a DL signal. In one example, DL signals from modulator/demodulators 432 and 433 may be transmitted via the antennas 434 and 435, respectively.

The UE 104-b may be an example of aspects of the UEs 104 described with reference to FIGS. 1-2. At the UE 104-b, the UE antennas 452 and 453 may receive the signals from the UE 104-a (e.g., over a sidelink) and may provide the received signals to the modulator/demodulators 454 and 455, respectively. Each modulator/demodulator 454 through 455 may condition (e.g., filter, amplify, downconvert, and digitize) a respective received signal to obtain input samples. Each modulator/demodulator 454 through 455 may further process the input samples (e.g., for OFDM, etc.) to obtain received symbols. A MIMO detector 456 may obtain received symbols from the modulator/demodulators 454 and 455, perform MIMO detection on the received symbols, if applicable, and provide detected symbols. A receive (Rx) processor 458 may process (e.g., demodulate, deinterleave, and decode) the detected symbols, providing decoded data for the UE 104-b to a data output, and provide decoded control information to a processor 480, or memory 482.

At the UE 104-b, a transmit processor 464 may receive and process data from a data source. The transmit processor 464 may also generate reference symbols for a reference signal. The symbols from the transmit processor 464 may be precoded by a transmit MIMO processor 466 if applicable, further processed by the modulator/demodulators 454 and 455 (e.g., for SC-FDMA, etc.), and be transmitted to the UE 104-a in accordance with the communication parameters received from the UE 104-a. At the UE 104-a, the signals from the UE 104-b may be received by the antennas 434 and 435, processed by the modulator/demodulators 432 and 433, detected by a MIMO detector 436 if applicable, and further processed by a receive processor 438. The receive processor 438 may provide decoded data to a data output and to the processor 440 or memory 442.

The processor 440 may in some cases execute stored instructions to instantiate a transmitting component 142 (see e.g., FIGS. 1 and 2).

The components of the UEs 104-a, 104-b may, individually or collectively, be implemented with one or more application specific integrated circuits (ASICs) adapted to perform some or all of the applicable functions in hardware. Each of the noted modules may be a means for performing one or more functions related to operation of the MIMO communication system 400. Similarly, the components of the UE 104-a may, individually or collectively, be implemented with one or more ASICs adapted to perform some or all of the applicable functions in hardware. Each of the noted components may be a means for performing one or more functions related to operation of the MIMO communication system 400.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

In the following, an overview of further examples is provided:

1. A method for wireless communication, comprising:
   determining a congestion level related to communicating with one or more devices in a wireless network;
   determining, based on the congestion level, a retransmission scheme for transmitting and/or retransmitting communications in the wireless network; and
   transmitting or retransmitting a communication in the wireless network based on the retransmission scheme.

2. The method of example 1, wherein the retransmission scheme defines a number of retransmissions to attempt before dropping the communication.

3. The method of any of examples 1 or 2, wherein the retransmission scheme defines a number of blind retransmissions and a number of feedback-based retransmissions to attempt before dropping the communication.

4. The method of example 3, wherein the retransmission scheme defines a pattern of one or more blind retransmissions and feedback-based retransmissions to attempt before dropping the communication.

5. The method of any of examples 3 or 4, further comprising indicating in the communication that feedback is expected for the communication.

6. The method of any of examples 1 to 5, wherein determining the retransmission scheme includes determining the retransmission scheme from a configured mapping of congestion levels to retransmission schemes.

7. The method of any of examples 1 to 6, wherein determining the congestion level is based at least in part on determining one or more metrics associated with a channel over which the communication can be transmitted in the wireless network.

8. The method of example 7, wherein the one or more metrics include one or more of a channel busy ratio, a number of resources reserved by the one or more devices, a number of resource allocations that can allow for transmitting the communication, a ratio of packets in a same priority or quality-of-service class of the communication that cannot be transmitted due to lack of resources, or any combination thereof.

9. The method of any of examples 7 or 8, wherein determining the congestion level includes mapping the one or more metrics to a congestion index, and wherein determining the retransmission scheme includes determining the retransmission scheme based on the congestion index.

10. The method of example 9, wherein determining the congestion level further includes determining the congestion index based at least in part on a priority, a quality-of-service class for the communication, or any combination thereof.

11. An apparatus for wireless communication, comprising:
a transceiver;
a memory configured to store instructions; and
one or more processors communicatively coupled with the transceiver and the memory, wherein the one or more processors are configured to:
determine a congestion level related to communicating with one or more devices in a wireless network;
determine, based on the congestion level, a retransmission scheme for transmitting and/or retransmitting communications in the wireless network; and
transmit or retransmit a communication in the wireless network based on the retransmission scheme.

12. The apparatus of example 11, wherein the retransmission scheme defines a number of retransmissions to attempt before dropping the communication.

13. The apparatus of any of examples 11 or 12, wherein the retransmission scheme defines a number of blind retransmissions and a number of feedback-based retransmissions to attempt before dropping the communication.

14. The apparatus of example 13, wherein the retransmission scheme defines a pattern of one or more blind retransmissions and feedback-based retransmissions to attempt before dropping the communication.

15. The apparatus of any of examples 13 or 14, wherein the one or more processors are further configured to indicate in the communication that feedback is expected for the communication.

16. The apparatus of any of examples 11 to 15, wherein the one or more processors are configured to determine the retransmission scheme from a configured mapping of congestion levels to retransmission schemes.

17. The apparatus of any of examples 11 to 16, wherein the one or more processors are configured to determine the congestion level based at least in part on determining one or more metrics associated with a channel over which the communication can be transmitted in the wireless network.

18. The apparatus of example 17, wherein the one or more metrics include one or more of a channel busy ratio, a number of resources reserved by the one or more devices, a number of resource allocations that can allow for transmitting the communication, a ratio of packets in a same priority or quality-of-service class of the communication that cannot be transmitted due to lack of resources, or any combination thereof.

19. The apparatus of any of examples 17 or 18, wherein the one or more processors are configured to determine the congestion level at least in part by mapping the one or more metrics to a congestion index, and wherein determining the retransmission scheme includes determining the retransmission scheme based on the congestion index.

20. The apparatus of example 19, wherein the one or more processors are configured to determine the congestion level based at least in part on a priority, a quality-of-service class for the communication, or any combination thereof.

21. An apparatus for wireless communication, comprising:
means for determining a congestion level related to communicating with one or more devices in a wireless network;
means for determining, based on the congestion level, a retransmission scheme for transmitting and/or retransmitting communications in the wireless network; and
means for transmitting or retransmitting a communication in the wireless network based on the retransmission scheme.

22. The apparatus of example 21, wherein the retransmission scheme defines a number of retransmissions to attempt before dropping the communication.

23. The apparatus of any of examples 21 or 22, wherein the retransmission scheme defines a number of blind retransmissions and a number of feedback-based retransmissions to attempt before dropping the communication.

24. The apparatus of any of examples 21 to 23, wherein the means for determining the retransmission scheme determines the retransmission scheme from a configured mapping of congestion levels to retransmission schemes.

25. The apparatus of any of examples 21 to 24, wherein the means for determining the congestion level is based at least in part on determining one or more metrics associated with a channel over which the communication can be transmitted in the wireless network.

26. A computer-readable medium, comprising code executable by one or more processors for wireless communication, the code comprising code for:
determining a congestion level related to communicating with one or more devices in a wireless network;
determining, based on the congestion level, a retransmission scheme for transmitting and/or retransmitting communications in the wireless network; and
transmitting or retransmitting a communication in the wireless network based on the retransmission scheme.

27. The computer-readable medium of example 26, wherein the retransmission scheme defines a number of retransmissions to attempt before dropping the communication.

28. The computer-readable medium of any of examples 26 or 27, wherein the retransmission scheme defines a number of blind retransmissions and a number of feedback-based retransmissions to attempt before dropping the communication.

29. The computer-readable medium of any of examples 26 to 28, wherein the code for determining the retransmission scheme determines the retransmission scheme from a configured mapping of congestion levels to retransmission schemes.

30. The computer-readable medium of any of examples 26 to 30, wherein the code for determining the congestion level is based at least in part on determining one or more metrics associated with a channel over which the communication can be transmitted in the wireless network.

What is claimed is:
1. A method for wireless communication, comprising:
receiving an indication corresponding to a congestion level associated with a channel in a wireless network; and
transmitting or retransmitting a communication over the channel in the wireless network based on a retransmission scheme, wherein the retransmission scheme defines a first number of blind retransmissions and a second number of feedback-based retransmissions to attempt before dropping the communication, wherein both of the first number of blind retransmissions and the second number of feedback-based retransmissions are associated with the congestion level.

2. The method of claim 1, wherein the retransmission scheme defines a pattern of one or more of the first number of blind retransmissions and one or more of the second number of feedback-based retransmissions to attempt before dropping the communication.

3. The method of claim 1, further comprising indicating in the communication that feedback is expected for the communication.

4. The method of claim 1, wherein the retransmission scheme is mapped in a configured mapping of congestion levels to retransmission schemes.

5. The method of claim 1, wherein the indication corresponding to the congestion level is based at least in part on one or more metrics associated with the channel.

6. The method of claim 5, wherein the one or more metrics include one or more of a channel busy ratio, a number of resources of the channel reserved by one or more devices, a number of resource allocations that can allow for transmitting the communication, a ratio of packets in a same priority or quality-of-service class of the communication that cannot be transmitted due to lack of resources, or any combination thereof.

7. The method of claim 5, wherein receiving the indication corresponding to the congestion level includes mapping the one or more metrics to a congestion index, and wherein the retransmission scheme is associated with the congestion index.

8. The method of claim 7, wherein the congestion index is based at least in part on a priority, a quality-of-service class for the communication, or any combination thereof.

9. An apparatus for wireless communication, comprising:
a transceiver;
a memory configured to store instructions; and
one or more processors communicatively coupled with the transceiver and the memory, wherein the one or more processors are configured to:
receive an indication corresponding to a congestion level associated with a channel in a wireless network; and
transmit or retransmit a communication over the channel in the wireless network based on a retransmission scheme, wherein the retransmission scheme defines a first number of blind retransmissions and a second number of feedback-based retransmissions to attempt before dropping the communication, wherein both of the first number of blind retransmissions and the second number of feedback-based retransmissions are associated with the congestion level.

10. The apparatus of claim 9, wherein the retransmission scheme defines a pattern of one or more of the first number of blind retransmissions and one or more of the second number of feedback-based retransmissions to attempt before dropping the communication.

11. The apparatus of claim 9, wherein the one or more processors are further configured to indicate in the communication that feedback is expected for the communication.

12. The apparatus of claim 9, wherein the retransmission scheme is mapped in a configured mapping of congestion levels to retransmission schemes.

13. The apparatus of claim 9, wherein the indication corresponding to the congestion level is based at least in part on one or more metrics associated with the channel.

14. The apparatus of claim 13, wherein the one or more metrics include one or more of a channel busy ratio, a number of resources of the channel reserved by one or more devices, a number of resource allocations that can allow for transmitting the communication, a ratio of packets in a same priority or quality-of-service class of the communication that cannot be transmitted due to lack of resources, or any combination thereof.

15. The apparatus of claim 13, wherein the one or more processors are configured to receive the indication corresponding to the congestion level at least in part by mapping the one or more metrics to a congestion index, and wherein determining the retransmission scheme includes determining the retransmission scheme based on the congestion index.

16. The apparatus of claim 15, wherein the congestion index is based at least in part on a priority, a quality-of-service class for the communication, or any combination thereof.

17. An apparatus for wireless communication, comprising:
means for receiving an indication corresponding to a congestion level associated with a channel in a wireless network; and
means for transmitting or retransmitting a communication over the channel in the wireless network based on a retransmission scheme, wherein the retransmission scheme defines a first number of blind retransmissions and a second number of feedback-based retransmissions to attempt before dropping the communication, wherein both of the first number of blind retransmissions and the second number of feedback-based retransmissions are associated with the congestion level.

18. The apparatus of claim 17, wherein the retransmission scheme is mapped in a configured mapping of congestion levels to retransmission schemes.

19. The apparatus of claim 17, wherein the indication corresponding to the congestion level is based at least in part on one or more metrics associated with the channel.

20. A non-transitory computer-readable medium, comprising code executable by one or more processors for wireless communication, the code comprising code for:
receiving an indication corresponding to a congestion level associated with a channel in a wireless network; and
transmitting or retransmitting a communication over the channel in the wireless network based on a retransmission scheme, wherein the retransmission scheme defines a first number of blind retransmissions and a second number of feedback-based retransmissions to attempt before dropping the communication, wherein both of the first number of blind retransmissions and the second number of feedback-based retransmissions are associated with the congestion level.

21. The non-transitory computer-readable medium of claim 20, wherein the retransmission scheme is mapped in a configured mapping of congestion levels to retransmission schemes.

22. The non-transitory computer-readable medium of claim 20, wherein the indication corresponding to the congestion level is based at least in part on one or more metrics associated with the channel.

23. The apparatus of claim 19, wherein the means for receiving the indication corresponding to the congestion level maps the one or more metrics to a congestion index, and wherein the retransmission scheme is associated with the congestion index.

24. The apparatus of claim 23, wherein the congestion index is based at least in part on a priority, a quality-of-service class for the communication, or any combination thereof.

25. The non-transitory computer-readable medium of claim 22, wherein the code for receiving the indication corresponding to the congestion level maps the one or more metrics to a congestion index, and wherein the retransmission scheme is associated with the congestion index.

26. The non-transitory computer-readable medium of claim 25, wherein the congestion index is based at least in part on a priority, a quality-of-service class for the communication, or any combination thereof.

* * * * *